United States Patent [19]

Hirsch et al.

[11] 4,303,822
[45] Dec. 1, 1981

[54] APPARATUS FOR WELDING STEEL SHEETS

[75] Inventors: Peter Hirsch, Aachen-Laurensberg; Bernhard Wübbels, Borken; Rolf Schäfer, Aachen, all of Fed. Rep. of Germany

[73] Assignee: Friedrich Eichhorn, Aachen, Fed. Rep. of Germany

[21] Appl. No.: 78,179

[22] Filed: Sep. 24, 1979

[51] Int. Cl.³ .............................................. B23K 9/18
[52] U.S. Cl. ................................. 219/73.1; 219/137.2
[58] Field of Search ...................... 219/73.1, 137.2, 73

[56] References Cited

U.S. PATENT DOCUMENTS

| | | | |
|---|---|---|---|
| 3,337,712 | 8/1967 | Lucey | 219/73.1 |
| 3,352,993 | 11/1967 | Suzuki | 219/73.1 |
| 4,151,389 | 4/1979 | Hirsch . | |

FOREIGN PATENT DOCUMENTS

| | | | |
|---|---|---|---|
| 283455 | 6/1971 | U.S.S.R. | 219/73.1 |
| 286106 | 3/1972 | U.S.S.R. | 219/73.1 |

OTHER PUBLICATIONS

Eichorn et al., "Electrogas & Electroslag Multi Layers High Speed Welding of Nuclear Pressure Vessel Steel", DVS-Berichte Band, 1978, pp. 168-172.

Eichorn et al., "Use of Metal Powder Additions to Improve the Strength and Toughness of High Speed Electroslag & Electrogas Welds in Micro Alloyed & Low Alloy Steels", IIW-doc XII Weld. Inst. Aachen.

Ivochkin, "Electroslag Welding with Powdered Filler Metal", in Weld Products, Great Britain, vol. 19, #6, 6/72, pp. 29-33.

Primary Examiner—Elliot A. Goldberg
Attorney, Agent, or Firm—Ernest F. Marmorek

[57] ABSTRACT

In an apparatus for electroslag welding of steel sheets with the aid of at least one wire electrode pair, a welding gap defined between the electrodes of the electrode pair, current-carrying conduits for the electrode pair, and a supply tube for supplying metal in a powdered state, and welding flux into the welding gap, the improvement includes a shielding device creating a duct along the current-carrying conduits. The duct, owing to the shielding device, is substantially free of any magnetic field, and the supply tube is positioned in the duct.

2 Claims, 2 Drawing Figures

APPARATUS FOR WELDING STEEL SHEETS

BACKGROUND OF THE INVENTION

The method and apparatus of U.S. Pat. No. 4,151,389 teaches welding operations at a current of the order of 2600 A. A current of this magnitude generates strong magnetic fields, so that special measures are required to permit the introduction of a metal powder into a welding gap during the welding operations. The metal powder serves as a filler material, and any surplus powder is allowed to fall by gravity into a slag bath. It is desirable that no current pass through the metal powder.

An inert carrier gas conveys the metal powder through flexible tubes outside the welding gap, and ejects it towards the front or rear wire electrode pair closely above the surface of the slag of the pool. Conventional transport by gravitational force, as has been used hitherto, no longer suffices for this purpose. Thus, there are provided powder supply or conveyer devices, which operate by means of a neutral supply gas. Additionally, any associated tube conduits must be spaced at a predetermined distance from the electrodes, and furthermore only the discharge openings of the supply nozzles may be positioned near the surface of the slag bath. The nozzles are mounted on, but insulated from, the current-carrying conduits for the electrodes, and their spacing and direction are adjustable by means of supports.

In order to ensure a welding process free of any disturbances, the supply nozzles for the metal powder must be directed precisely towards the center of the pairs of wire electrodes, and must terminate just above the surface of the slag bath. Otherwise short circuit paths of metal powder may form between any metal sheet edge, and the wire electrodes. This requirement for precision of the metal powder supply is met only through the most careful adjustment of the nozzles. Furthermore, this embodiment of a metal powder supply is restricted to two pairs of wire electrodes.

An earlier report dealing with "A substantial increase of the welding velocity during electroslag welding while simultaneously improving the quality of the weld", published in "DVS Berichte, Vol. 31," provides inter alia details of the composition of the metal powders used.

An early Russian publication "On the Effectiveness of Using Filler Metal in Powder Form in Electroslag Welding" Svar. Proiz, 1969, No. 11, pp. 18-19, shows that the use of metal in powder form as a filler increases the productivity of electroslag welding, and greatly improves the properties of the welded joint. A later Russian publication "Electroslag Welding with Powdered Filler Metal," Svar. Proiz, 1972, No. 5, pp 17-19, relates to a method and equipment which have been developed for electroslag welding of 25-60 mm mild and low-alloy steels using filler metal and solid section electrode wire.

SUMMARY OF THE INVENTION

In order to relieve the operator of the welding device from having to perform these adjustments, and additionally also to dispense with hoses and their locking mechanisms, it is proposed, according with the present invention, to use supply tubes for the metal powder, to position the supply tubes along the pairs of conduits carrying the current, and to connect the supply tubes rigidly therewith. This permits the metal powder to be also supplied within the welding gap, and several pairs of conduits carrying the current may be operated in series, without any disturbances occurring during the welding process.

In order to avoid in this arrangement any disturbing influence of the magnetic field generated by the electrodes acting on the supply of the metal powder, it is furthermore proposed to screen the supply tubes magnetically with respect to the pairs of current-carrying conduits. For this purpose there are used, according to another feature of the present invention, metal transformator sheets coated with a lacquer on one side, which are individually punched out in a U-shape, and arranged or piled up in the form of U-shaped rails, within which U-shaped rails the current-carrying conduits are embedded. These U-shaped rails preferably guide the magnetic field through the free ends of the U-shaped profile towards the exterior. This creates on the rear of the U-shaped profile a duct substantially free of any magnetic field, the supply tubes for the metal powder being arranged in that duct. The supply tubes terminate just below the location where the wire electrodes project from the current-carrying conduits, and are arranged to spray the metal powder onto the wire electrodes.

BRIEF DESCRIPTION OF THE DRAWING

In the drawing, a preferred version of the device, according to the present invention, is illustrated schematically wherein.

DESCRIPTION OF THE PREFERRED EMBODIMENTS

Figure 1:
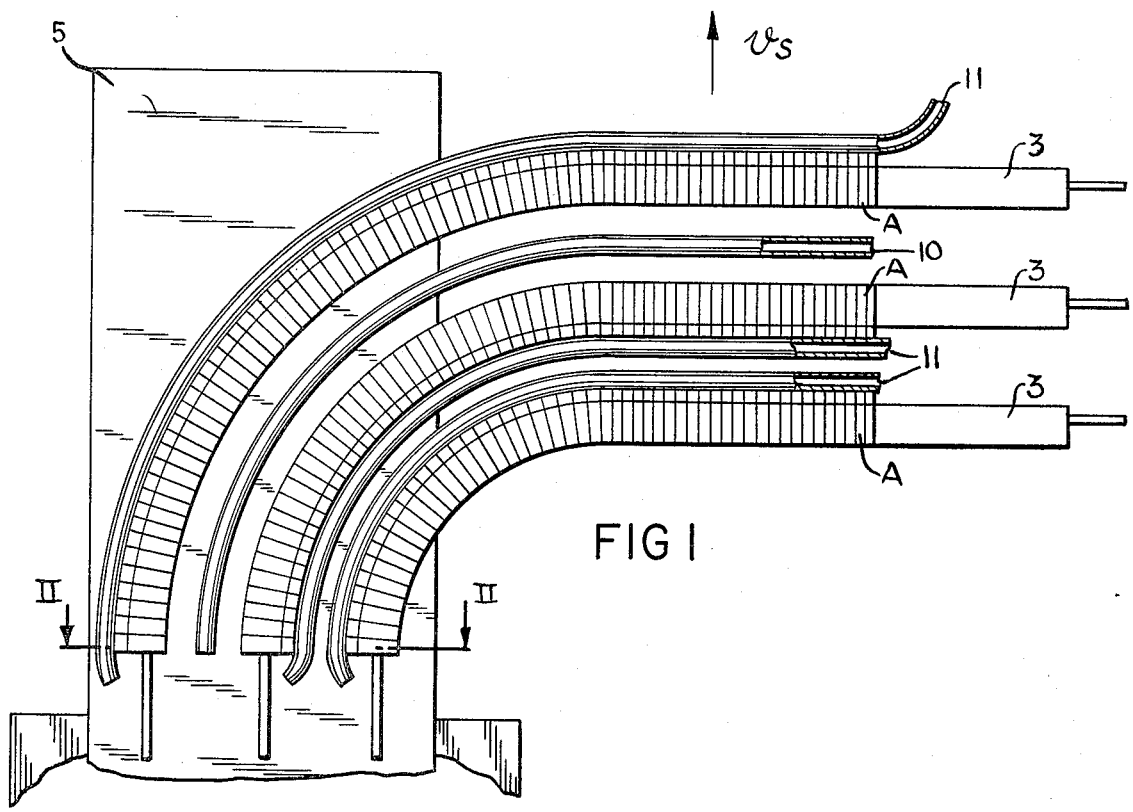
FIG. 1 shows a side view of the entire arrangement.
Figure 2:
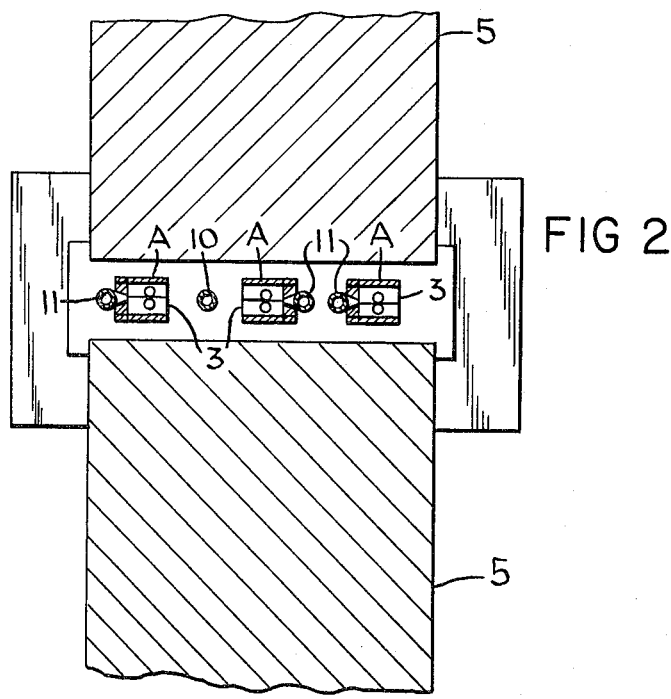
FIG. 2 shows a section along the line II—II of FIG. 1, and also the sheets of steel with the sliding shoes of copper, so as to clearly illustrate the position of the current-carrying conduits and of the metal powder supply conduits in the gap.

Reference should be made to U.S. Pat. No. 4,151,389, incorporated into the present application by reference, and which claims priority from German patent DE No. 26 03 020, for the welding apparatus used in conjunction with the device of the present invention, the same reference numerals being used for equivalent items in both the aforesaid U.S. patent, and the present application.

For the welding of relatively thick stationary metal sheets 5, three pairs of generally upwardly movable wire electrodes 3 are required. Each pair is provided with an upwardly movable supply tube 11 for metal powder, the metal powder acting as filler material; the velocity of upward movement of the supply tubes 11 equals the velocity of welding. Each pair of electrodes is rigidly connected to the current-carrying conduits for the electrodes. In order to create a duct for the supply tubes substantially free of any magnetic field, transformer sheets A, each of which is lacquered on one side, are punched out in a U-shape, piled up into laminated rails having a U-shaped profile, within which the current-carrying conduits for the wire electrodes 3 are disposed, which causes any resulting magnetic field to emanate only from the edges of the U-shaped profile, the rails acting as a shielding means so as to prevent the occurrence of any magnetic field in the duct. The conduits 10 for a non-magnetic welding powder do not require any magnetic shielding. The supply tubes 11 are spot-welded to the longitudinal center portion of the assembled and rail-shaped transformer sheets A. The wire electrodes 3, denoted schematically by lines in the left bottom portion of FIG. 1 must, of course, join the current-carrying conduits for the electrodes.

We claim:

1. In an apparatus for electroslag welding of steel sheets with the aid of at least one wire electrode pair, a welding gap being defined between the electrodes of said electrode pair, current-carrying means for the electrode pair, and supply means for supplying metal in a powdered state, and welding powder into said welding gap, the improvement comprising:

shielding means creating an elongated area along said current-carrying means, said elongated area, owing to the shielding means, being substantially free of any magnetic field, and wherein said supply means includes at least one supply tube positioned in said elongated area.

2. An apparatus according to claim 1, wherein said current-carrying means include pairs of electrodes, and said shielding means comprise a plurality of U-shaped metal transformer sheets, each sheet being lacquered on one side thereof, said sheets being assembled to form rails, each disposed along a pair of electrodes and wherein each supply tube is secured to the webs of said sheets of each rail in said elongated area.

* * * * *